US011945240B1

(12) United States Patent
Holl et al.

(10) Patent No.: US 11,945,240 B1
(45) Date of Patent: Apr. 2, 2024

(54) IMAGE-ADAPTIVE INKJET PRINTHEAD STITCHING PROCESS

(71) Applicant: Eastman Kodak Company, Rochester, NY (US)

(72) Inventors: Manfred L. Holl, Crailshiem (DE); Rainer Kuessel, Huertgenwald (DE); Andreas Weiser, Kuchen (DE)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 18/212,762

(22) Filed: Jun. 22, 2023

(51) Int. Cl.

| | |
|---|---|
| ***G06K 15/00*** | (2006.01) |
| ***B41J 29/393*** | (2006.01) |
| ***G06K 15/02*** | (2006.01) |
| ***G06T 7/13*** | (2017.01) |
| ***G06T 7/90*** | (2017.01) |

(52) U.S. Cl.
CPC ........ *B41J 29/393* (2013.01); *G06K 15/1822* (2013.01); *G06K 15/1886* (2013.01); *G06K 15/408* (2013.01); *G06T 7/13* (2017.01); *G06T 7/90* (2017.01); *G06K 2215/101* (2013.01); *G06T 2207/10024* (2013.01); *G06T 2207/30108* (2013.01)

(58) Field of Classification Search
None
See application file for complete search history.

(56) References Cited

U.S. PATENT DOCUMENTS

| | | | | |
|---|---|---|---|---|
| 6,068,362 A | 5/2000 | Dunand et al. | | |
| 7,118,188 B2 | 10/2006 | Vilanova et al. | | |
| 7,871,145 B1 * | 1/2011 | Enge | G06K 15/107 | 347/14 |
| 8,104,861 B2 | 1/2012 | Saettel et al. | | |
| 8,123,326 B2 | 2/2012 | Saettel et al. | | |
| 8,393,709 B2 | 3/2013 | Enge | | |
| 8,760,712 B2 | 6/2014 | Enge et al. | | |
| 8,842,330 B1 * | 9/2014 | Enge | B41J 3/543 | 358/3.23 |
| 8,842,331 B1 * | 9/2014 | Enge | B41J 2/2135 | 358/3.23 |
| 8,845,059 B2 | 9/2014 | Enge et al. | | |
| 8,857,938 B2 | 10/2014 | Enge et al. | | |

(Continued)

FOREIGN PATENT DOCUMENTS

| | | |
|---|---|---|
| EP | 729846 B1 | 1/2000 |

*Primary Examiner* — Miya J Cato
*Assistant Examiner* — Pawan Dhingra
(74) *Attorney, Agent, or Firm* — David A. Novais

(57) ABSTRACT

A method of printing on an inkjet printer including a plurality of overlapping jetting modules includes analyzing image data within a stitch area to designate white pixels and non-white pixels. For rows where the stitch area includes white pixels, a hard stitch boundary is defined within the stitch area where image pixels to the left of the hard stitch boundary are to be printed using a left jetting module and image pixels to the right of the hard stitch boundary are to be printed using a right jetting module. For image regions where the rows of image pixels within the stitch area include only non-white pixels, a soft-stitching path is defined through the image region, and a fading function is used to gradually transition from printing image pixels with the left jetting module to printing image pixels with the right jetting module in a transition zone around the soft-stitching path.

12 Claims, 11 Drawing Sheets

(56) References Cited

U.S. PATENT DOCUMENTS

| | | | | |
|---|---|---|---|---|
| 2004/0213482 A1* | 10/2004 | Silverbrook | B41J 2/17546 | 382/312 |
| 2011/0012949 A1* | 1/2011 | Enge | G06K 15/107 | 347/12 |
| 2011/0063354 A1* | 3/2011 | Enge | G06K 15/107 | 347/14 |
| 2014/0063513 A1* | 3/2014 | Enge | G06K 15/10 | 358/1.8 |
| 2020/0282742 A1* | 9/2020 | Ito | B41J 13/0027 | |

* cited by examiner

IMAGE-ADAPTIVE INKJET PRINTHEAD STITCHING PROCESS

FIELD OF THE INVENTION

This invention pertains to the field of digital printing and more particularly to a method for printing image data in an inkjet printer with a plurality of overlapping jetting modules.

BACKGROUND OF THE INVENTION

FIG. 1 shows a diagram illustrating an exemplary multi-channel digital printing system 10 for printing on a web of receiver medium 14. The printing system 10 includes a plurality of printing modules 12, each adapted to print image data for an image plane corresponding to a different color channel. In some printing systems 10, the printing modules 12 are inkjet printing modules adapted to print drops of ink onto the receiver medium 14 through an array of inkjet nozzles. Alternately, the printing modules 12 can utilize any type of digital printing technology known in the art.

In the illustrated example, the printing modules 12 print cyan (C), magenta (M), yellow (Y) and black (K) colorants (e.g., inks) onto the receiver medium 14 as it is transported through the printing system using a media transport system (not shown in FIG. 1) from upstream to downstream in a receiver motion direction 16. (The receiver medium direction 16 is commonly referred to as the "in-track direction," and the direction perpendicular to the receiver medium direction 16 is commonly referred to as the "cross-track direction.") In other cases, the printing modules 12 can be adapted to print different numbers and types of colorants. For example, additional printing modules 12 can be used to print specialty colorants, or extended gamut colorants. In some cases, a plurality of the printing modules 12 can be used to print the same colorant (e.g., black), or density variations of the same color (e.g., gray and black). In some cases, the printing system 10 is adapted to print double-sided pages. In this case, one or more of the printing modules 12 can be arranged to print on a back side of the receiver medium 14.

The exemplary printing system 10 also includes dryers 18 for drying the ink applied to the receiver medium 14 by the printing modules. While the exemplary printing system 10 illustrates a dryer 18 following each of the printing modules 12, this is not a requirement. In some cases, a single dryer 18 may be used following the last printing module 12, or dryers 18 may only be provided following some subset of the printing modules 12. Depending on the printing technology used in the printing modules 12, and the printing speed, it may not be necessary to use any dryers 18.

Downstream of the printing modules 12, an optional imaging system 20, which can include one or more imaging devices 22 can be used for capturing images of printed images on the receiver medium 14. In some cases, the imaging system 20 can include a single imaging device 22 that captures an image of the entire width of the receiver medium 14, or of a relevant portion thereof. In other cases, a plurality of imaging devices 22 can be used, each of which captures an image of a corresponding portion of the printed image. In some embodiments, the position of the imaging devices 22 can be adjusted during a calibration process to sequentially capture images of different portions of the receiver medium 14. For cases where the printing system 10 prints double-sided images, some of the imaging devices 22 may be adapted to capture images of a second side of the receiver medium 14.

In some cases, the imaging devices 22 can be digital camera systems adapted to capture 2-D images of the receiver medium 14. In other embodiments, the imaging devices 22 can include 1-D linear sensors that are used to capture images of the receiver medium 14 on a line-by-line basis as the receiver medium 14 moves past the imaging system 20. The imaging devices 22 can equivalently be referred to as "cameras" or "camera systems" or "scanners" or "scanning systems," independent of whether they utilize 2-D or 1-D imaging sensors. Similarly, the images provided by the imaging devices 22 can be referred to as "captured images" or "scanned images" or "scans." In some cases, the imaging devices 22 include color sensors for capturing color images of the receiver medium, to more easily distinguish between the colorants deposited by the different printing modules 12.

FIG. 2 is a diagram of an exemplary printing module 12. In this configuration, the printing module 12 is an inkjet printing system that includes a plurality of jetting modules 30 arranged across a width dimension of the receiver medium 14 in a staggered array configuration. (The width dimension of the receiver medium 14 is the dimension perpendicular to the receiver motion direction 16.) Such inkjet printing modules 12 are sometimes referred to as "lineheads." The jetting modules 30 are sometimes referred to as "printheads." Note that within the context of the present disclosure, the printing modules 12 are logical entities that include a plurality of partially-overlapping jetting modules 30, but they are not necessarily physically connected into a single unit. For example, the jetting modules 30 can be mounted on independent mounting assemblies rather than on a single common mounting assembly.

Each of the jetting modules 30 includes a plurality of inkjet nozzles arranged in nozzle array 31, and is adapted to print a swath of image data in a corresponding printing region 32. In the illustrated example, the nozzle arrays 31 are one-dimensional linear arrays, but the invention is also applicable to inkjet jetting modules 30 having nozzles arrayed in two-dimensional arrays as well. Common types of inkjet jetting modules 30 include continuous inkjet (CI) printheads and drop-on-demand (DOD) printheads. Commonly, the inkjet jetting modules 30 are arranged in a spatially-overlapping arrangement where the printing regions 32 overlap in overlap regions 34. Each of the overlap regions 34 has a corresponding centerline 36. In the overlap regions 34, nozzles from more than one nozzle array 31 can be used to print the image data.

Stitching is a process that refers to the merging/alignment of the printed images produced from multiple jetting modules 30 for the purpose of creating the appearance of a single page-width line head. For example, as shown in FIG. 2, six jetting modules 30, each three inches in length, can be stitched together at overlap regions 34 to form a page-width printing module 12 having a printing width of about eighteen inches. The page-width image data is processed and segmented into separate portions that are sent to each jetting module 30 with appropriate time delays to account for the staggered positions of the jetting modules 30. The image data portions printed by each of the jetting modules 30 is sometimes referred to as "swaths." Stitching systems and algorithms are used to determine which nozzles of each nozzle array 31 should be used for printing in the overlap region 34. Preferably, the stitching algorithms create a boundary between the printing regions 32 that is not readily detected by eye. One such stitching algorithm is described in commonly-assigned U.S. Pat. No. 7,871,145 to Enge, entitled "Printing method for reducing stitch error between overlapping jetting modules," which is incorporated herein by reference.

One problem which is common in printing systems 10 that include a plurality of jetting modules 30 is alignment of the image data printed by the different jetting modules 30. There are a variety of different types of alignment errors that can occur. For color printing systems 10 having a plurality of different printing modules 12, the image data printed by one printing module 12 (e.g., a first color channel) can be misaligned with the image data printed by a second printing module 12 (e.g., a second color channel). These color-to-color alignment errors can occur in either or both of the in-track direction or the cross-track direction. Similarly, for printing modules 12 that include a plurality of jetting modules 30 the image data printed by one jetting module 30 can be misaligned with the image data printed by a second jetting module 30.

The alignment errors can result from a variety of different causes. In some cases, the alignment can result from variations in the geometry of the jetting modules 30 during manufacturing, and variations in the positioning of the jetting modules 30 within the printing system 10. In other cases, alignment errors can result from interactions between the printing system 10 and the environment (e.g., airflow perturbations can cause ink drops to be misdirected in inkjet printing systems). Another common source of misalignment is dimensional changes in the receiver medium 14 that can occur as the receiver medium 14 moves between different printing modules 12. For example, the absorption of water in the ink printed by one channel can cause the receiver medium 14 to expand before a subsequent channel is printed. Similarly, when the receiver medium 14 passes through a dryer, this can cause the receiver medium 14 to shrink. Such dimensional changes in the receiver medium 14 will generally be a function of a variety of factors such as media type, image content of the printed image, and environmental conditions. Dimensional changes can also result from other types of processing operations that are performed between the printing of one channel and another. For example, in an electrophotographic printing system, a fusing operation may be performed between the printing of a front side image and a back side image that can produce dimensional changes of the receiver medium 14.

A variety of different methods have been proposed in the prior art to detect and correct for alignment errors. Typically, the methods involve printing test patterns and capturing an image of the printed test pattern to characterize the alignment errors. Appropriate adjustments can then be made to correct for the alignment errors. In some cases, the adjustments can involve adjusting the physical positions of system components (e.g., the printing modules). In other cases, the adjustments can involve modifying the image data sent to the jetting modules 30 (e.g., by shifting the image data) or modifying time delays between the time that the image data is printed by one jetting module 30 and the time that the corresponding image data is printed by another jetting module 30.

Due to mechanical tolerances in the manufacturing process, it may be difficult to maintain an accurate alignment between the jetting modules 30 in a printing module 12. Moreover, even if the jetting modules 30 are perfectly aligned, differences in the aim of individual nozzles in the nozzle arrays 31 may make them appear to be misaligned in the printed image. Any such alignment errors can produce visible artifacts in the printed image.

Alignment errors between the jetting modules 30 in the cross-track direction can result in artifacts being produced at the boundaries between the printheads (e.g., dark streaks where the multiple nozzles print at the same location, or light streaks where no nozzles print at a particular location). Alignment errors between the jetting modules 30 in the in-track direction can result in artifacts being produced where portions of a linear feature in the image that spans the overlap region don't align with each other and appear to be broken.

U.S. Pat. No. 6,068,362 to Dunand et al., entitled "Continuous multicolor ink jet press and synchronization process for the press," discloses a method for synchronizing printheads of a printing system. The printing system includes a plurality of printheads with optical sensors mounted "before" each printhead (upstream) at some predetermined distance. A print media passes beneath the printheads in order to permit the printheads to print marks thereon. The optical sensors capture an image of the marks which are input into a synchronization circuit. The synchronization circuit determines whether any deviation from the desired target is present. If there is a deviation, the synchronization circuit modifies the line spacing of the printhead of interest in order to compensate for the inaccuracies. In this system, the adjusted line spacings are based on an output of an encoder attached to the paper drive motor. Such a system requires extremely high cost encoders to provide the resolution needed for the registration demands of a printer system. It also is subject to errors associated with slip or coupling between the motor and the motion of the paper through the print zone. This system is also very susceptible to errors produced by variations in motor speed such as wow and flutter. In this configuration, there is an inherent time lag from image capture until the media passes beneath the printhead. This time lag in and of itself introduces another variable which is also subject to deviation from its desired target.

European patent document EP0729846B1 by Piatt et al., entitled "Printed reference image compensation system," discloses a similar method for aligning the images for a plurality of different color channels in a multi-color printing system. Registration marks are printed in the margin of the image as the print media passes beneath each printhead. A camera positioned before a second printhead captures an image of the registration mark printed by a first printhead. This permits the second printhead to adjust its printing if a deviation in the expected position of the registration mark is detected from the captured image.

U.S. Pat. No. 7,118,188 to Vilanova et al., entitled "Hardcopy apparatus and method," makes use of the redundancy of nozzles in an overlap region to correct for cross-track alignment errors. Different masks are provided that use different nozzles in the overlap regions 34. In some embodiments, an appropriate mask can be selected by measuring the width of the band artifact produced in the overlap regions 34 for a printed image. In other embodiments, a test pattern is printed which includes different areas corresponding to a set of masks. The optimal mask is then selected by visual evaluation or automatic evaluation with an optical scanner for use in subsequent printing operations.

Commonly-assigned U.S. Pat. No. 8,104,861 to Saettel et al., entitled "Color to color registration target," discloses a method for calibrating a multi-color inkjet printing system. A test target is printed that includes three marks printed with a first color in which two of the three marks are aligned along a first axis, and the third mark is offset by a predetermined distance along a second axis. The test target includes a fourth mark printed with a second color in which the intended position is aligned along the first axis with one of the first three marks, and is aligned along the second axis with another of the first three marks. The locations of the printed marks are detected and used to determine an appropriate alignment correction needed to align the first and second colors.

Commonly-assigned U.S. Pat. No. 8,123,326 to Saettel et al., entitled "Calibration system for multi-printhead ink systems," which is incorporated herein by reference, discloses a calibration method to correct for alignment errors in an inkjet printer having multiple printheads. The method includes printing a first test mark using a first printhead and a second test mark using a second printhead. The nominal positions of the first and second marks are separated by a predetermined spacing in the cross-track direction, and are aligned in the in-track direction. An image capture device is used to determine the positions of the printed marks, and an error factor is determined based on the position of the second mark relative to the first mark. The pulse train used to control the second printhead is shifted responsive to the error factor to correct in-track alignment errors. One limitation of this method is that the necessary separation between the first test mark and the second test mark in the cross-track direction means that the in-track alignment of the printed image data will only be perfectly corrected at those cross-track positions. This does not ensure that the printed image data will be perfectly aligned at the boundaries between the printheads (e.g., at centerlines 36 in FIG. 2).

Commonly-assigned, U.S. Pat. No. 8,845,059 to Enge et al., entitled "Aligning print data using matching pixel patterns," together with related U.S. Pat. No. 8,760,712, describe a method for aligning multi-channel digital image data for a digital printer having a plurality of printheads. A test pattern including test pattern indicia printed using individual printheads is scanned and analyzed to detect locations of the printed test pattern indicia. One of the printheads is designated to be a reference printhead, and one or more of the other printheads are designated to be non-reference printheads. Spatial adjustment parameters are determined for each of the non-reference printheads responsive to the detected test pattern indicia locations. Digital image data for the non-reference printheads is modified by designating an input pixel neighborhood within which an image pixel should be inserted or deleted, comparing the image pixels in the input pixel neighborhood to a plurality of predefined pixel patterns to identify a matching pixel pattern; and determining a modified pixel neighborhood responsive to the matching pixel pattern.

Commonly-assigned U.S. Pat. No. 8,842,330 to Enge, entitled "Method to determine an alignment errors in image data and performing in-track alignment errors correction using test pattern," discloses a method for aligning image data printed on a receiver medium in a multi-printhead printer. The method includes printing a test pattern including features separated by predefined test pattern feature separations, where some features are printed with a first printhead and some features are printed with a second printhead. An image of the printed test pattern is analyzed to determine a first camera pixel separation between two features printed with the first printhead, which is used to determine a camera scale factor. The camera scale factor is used to scale a second camera pixel separation between a feature printed with first printhead and a feature printed with the second printhead. The scaled second camera pixel separation is compared to a corresponding test pattern feature separation to determine an alignment error, which is used to adjust the alignment of the image data printed with at least one of the printheads.

There remains a need for an improved method for aligning image data printed on a receiver medium using two printheads in a multi-printhead printer that overcomes the limitations of the prior art.

SUMMARY OF THE INVENTION

The present invention represents a method of printing on an inkjet printer including a linehead with a plurality of jetting modules in a staggered, partially overlapping configuration, each of the plurality of jetting modules including a plurality of nozzles, wherein some of the nozzles of adjacent jetting modules overlap each other in a stitch area, including:

- receiving image data including an array of image pixels to be printed using the inkjet printer;
- for image pixels that fall within a particular stitch area where the nozzles of a left jetting module and a right jetting module overlap:
  - analyzing the image data within the particular stitch area to designate white pixels and non-white pixels;
  - for rows of image pixels where the particular stitch area includes white pixels:
    - defining a hard stitch boundary within the stitch area;
    - storing printing data indicating that image pixels within the particular stitch area to the left of the hard stitch boundary are to be printed using the left jetting module; and
    - storing printing data indicating that image pixels within the particular stitch area to the right of the hard stitch boundary are to be printed using the right jetting module; and
  - for image regions of the image data where the rows of image pixels within the stitch area include only non-white pixels:
    - defining a soft-stitching path through the image region; and
    - storing printing data indicating that image pixels within the image region are to be printed using a fading function that gradually transitions from printing image pixels with the left jetting module to printing image pixels with the right jetting module in a transition zone around the soft-stitching path.

This invention has the advantage that the visibility of stitch artifacts in the transition zone are reduced.

It has the additional advantage that hard stitch boundary is positioned in white image regions for rows of the image containing white pixels so that the stitch boundary is not visible.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Applications for inkjet heads, especially in the packaging market, do not always allow a precise mechanical "stitch" of neighboring jetting modules. As a result, with traditional "hard-stitching" it is common for the stitch point to be visible in the printed image, either as a lighter line or a darker line along the boundary depending on the alignment errors of the printing modules due to tolerances in the printed material and the physical components.

This present invention describes a "soft-stitching" method which is effective to visually hide the stitch point by overlapping the jetting modules and distributing the error over the overlapping area. In an exemplary embodiment, the algorithm is implemented in prepress software used to create the inkjet print file, and is run in the process of separation and rasterization of the image data.

Figure 1:
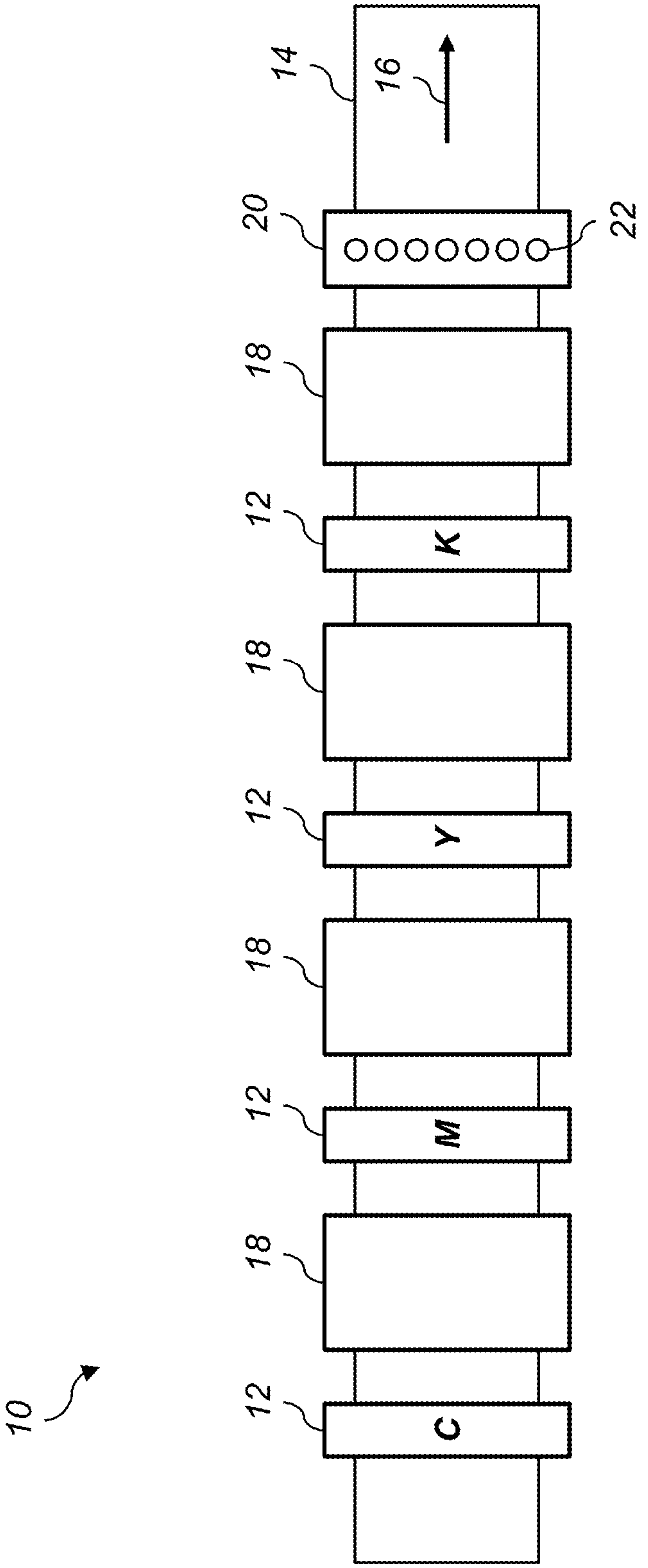
FIG. 1 is a diagram illustrating an exemplary multi-channel digital printing system.

The present invention is well-suited for use in roll-fed inkjet printing systems, such as the printing system 10 described earlier with respect to FIG. 1, that apply colorant (e.g., ink) to a web of continuously moving receiver media 14. In such systems, the jetting modules 30 (FIG. 2) selectively moisten at least some portion of the receiver medium 14 as it moves through the printing system 10, but without the need to make contact with the receiver medium 14. While the present invention will be described within the context of a roll-fed inkjet printing system, it will be obvious to one skilled in the art that it could also be used for other types of multi-printhead printing systems as well, including sheet-fed printing systems and electrophotographic printing systems.

In the context of the present invention, the terms "web media" or "continuous web of media" are interchangeable and relate to a receiver medium 14 (e.g., a print media) that is in the form of a continuous strip of media that is transported through the printing system 10 in an in-track direction using a web media transport system from an entrance to an exit thereof. The continuous web media serves as the receiving medium 14 to which one or more colorants (e.g., inks or toners), or other coating liquids are applied. This is distinguished from various types of "continuous webs" or "belts" that are actually transport system components (as compared to the image receiving media) which are typically used to transport a cut sheet medium in an electrophotographic or other printing system. The terms "upstream" and "downstream" are terms of art referring to relative positions along the transport path of a moving web; points on the web move from upstream to downstream.

Additionally, as described herein, the example embodiments of the present invention provide a printing system or printing system components typically used in inkjet printing systems. However, many other applications are emerging which use inkjet printheads to emit liquids (other than inks) that need to be finely metered and deposited with high spatial precision. As such, as described herein, the terms "liquid" and "ink" and "colorant" can be taken to refer to any material that can be deposited by the jetting modules 30 described below. Likewise, the terms "printed image" and "print" can be taken to refer to any pattern of material deposited on a receiver medium.

In accordance with some exemplary embodiments of the present invention, the digital image data provided to the first and second jetting modules 30 is modified to provide reduced visibility of the stitch boundary between image content printed by first and second jetting modules 30.

Figure 2:
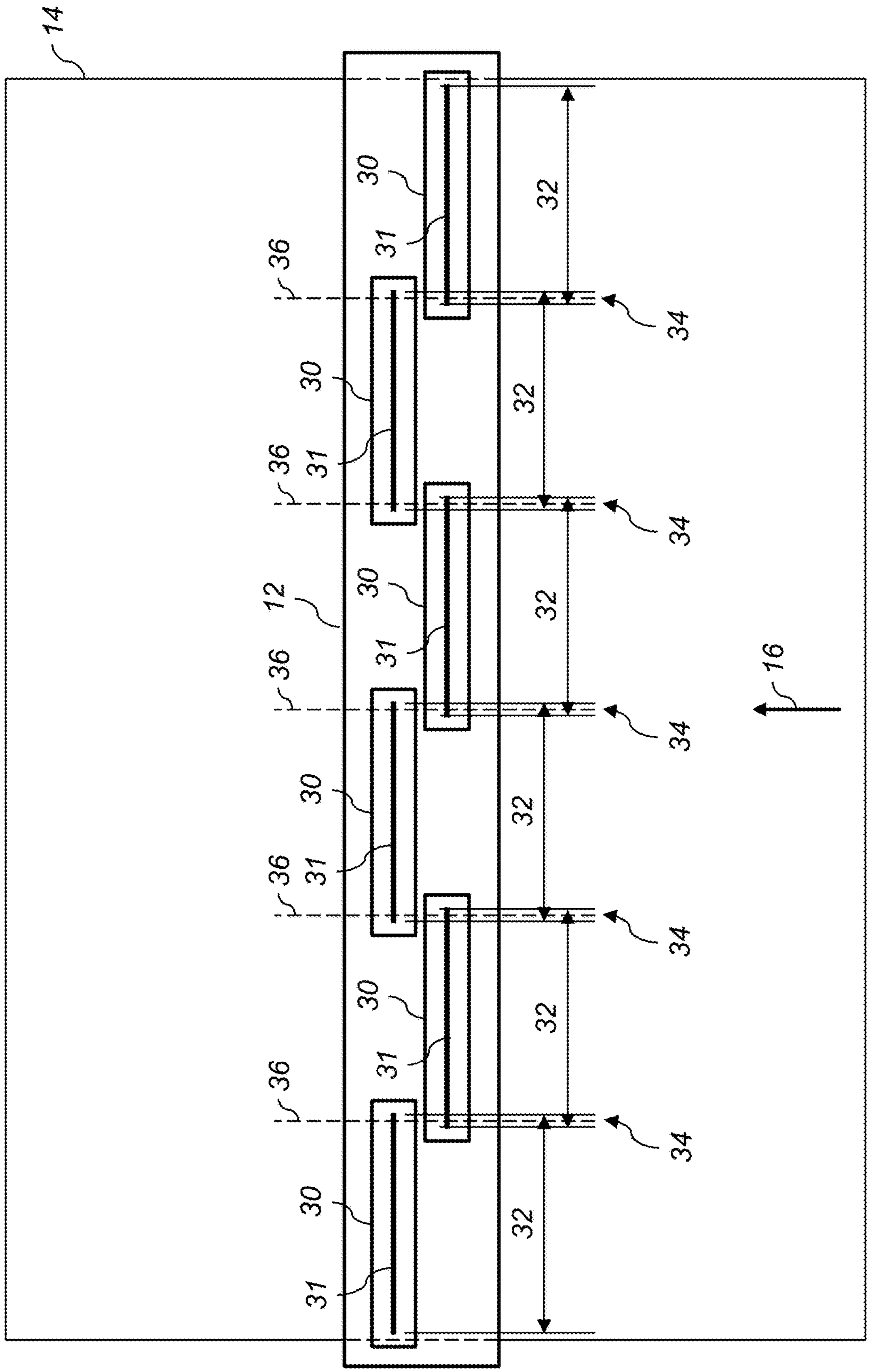
FIG. 2 is a diagram showing an exemplary printing module having a plurality of printheads.

Consider the case where it is desired to stitch together image data printed using a plurality of jetting modules 30 in a particular printing module 12 as illustrated in FIG. 2. The printing modules 12 can also be referred to as "lineheads." As the receiver medium 14 moves past the printing module 12 in the receiver-medium direction 16 (i.e., the "in-track direction"), a particular in-track position on the receiver medium 14 will pass underneath the nozzles of the jetting modules 30 at different times. The printed image data formed by the different jetting modules 30 can be aligned in the in-track direction by using appropriate time delays between the times that the image data is sent to the different jetting modules 30. Nominal time delays can be determined given a knowledge of the nominal transport velocity of the receiver medium 14 and the nominal positions of the jetting modules 30. However, due to manufacturing tolerances in the positions of the various system components, as well as other factors such as interactions with the printer environment (e.g., thermal expansion of system components and air currents that can affect the trajectory of ejected drops), alignment errors will typically result when images are printed using the nominal time delays. Therefore, it is generally desirable to provide an alignment process to determine appropriate alignment corrections. Examples of such alignment methods would include those described in the aforementioned U.S. Pat. No. 8,123,326 by Saettel et al. and U.S. Pat. No. 8,842,330 to Enge.

In accordance with the present invention, stitching errors are made less obvious by distributing them over a larger area in the overlap region 34. In this way, there is not one point where the image transitions from one jetting module 30 to the other, but instead the transition point is variable or there is a fading from one head to the other. As with FM rasterization, each pixel can only be either printed or not printed (i.e., it is either 100% or 0% of each color), but the resulting error can be distributed over neighboring pixels using an error diffusion algorithm. Additionally, when there are unprinted (i.e., "white") areas of the image across the stitch, the transition from one jetting module 30 to the other is arranged such that it occurs in such white areas wherever possible, since neither a line, nor a gap will be visible there.

Figure 3:
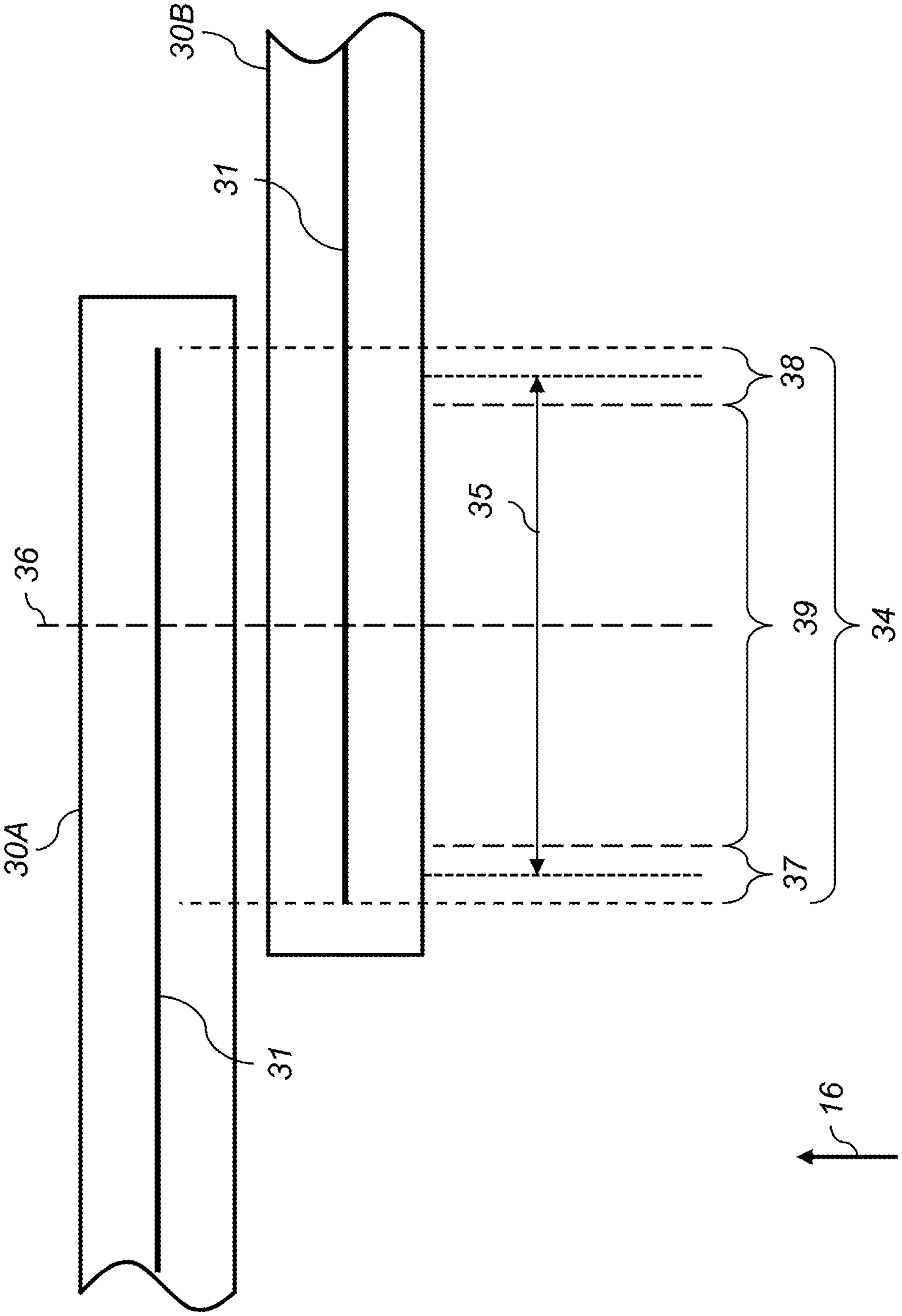
FIG. 3 shows an overlap region between two jetting modules.

FIG. 3 shows a close-up view of an overlap region 34 in the printing module 12 of FIG. 2. The overlap region 34 occurs between a left jetting modules 30A and a right jetting module 30B. The overlap region 34 can also be referred to as a "stitch area." The overlap region 34 is further divided into a left outer area 37, a right outer area 38, and an inner area 39. Left and right outer areas 37, 38 have a configurable width and are at the left and right borders of the overlap region 34. As will be discussed later, the algorithm changes when the stitch point goes into one of those areas to avoid a hard transition of the image to one jetting module to the other at the edge of the overlap region 34, which could cause a line or gap artifact. The inner area 39 is the region where the algorithm runs in a default mode with better performance. A configurable white-stitch region 35 is also defined which restricts the white-point stitching to avoid the white-point stich algorithm getting stuck on the outside of the overlap region 34.

Figure 4:
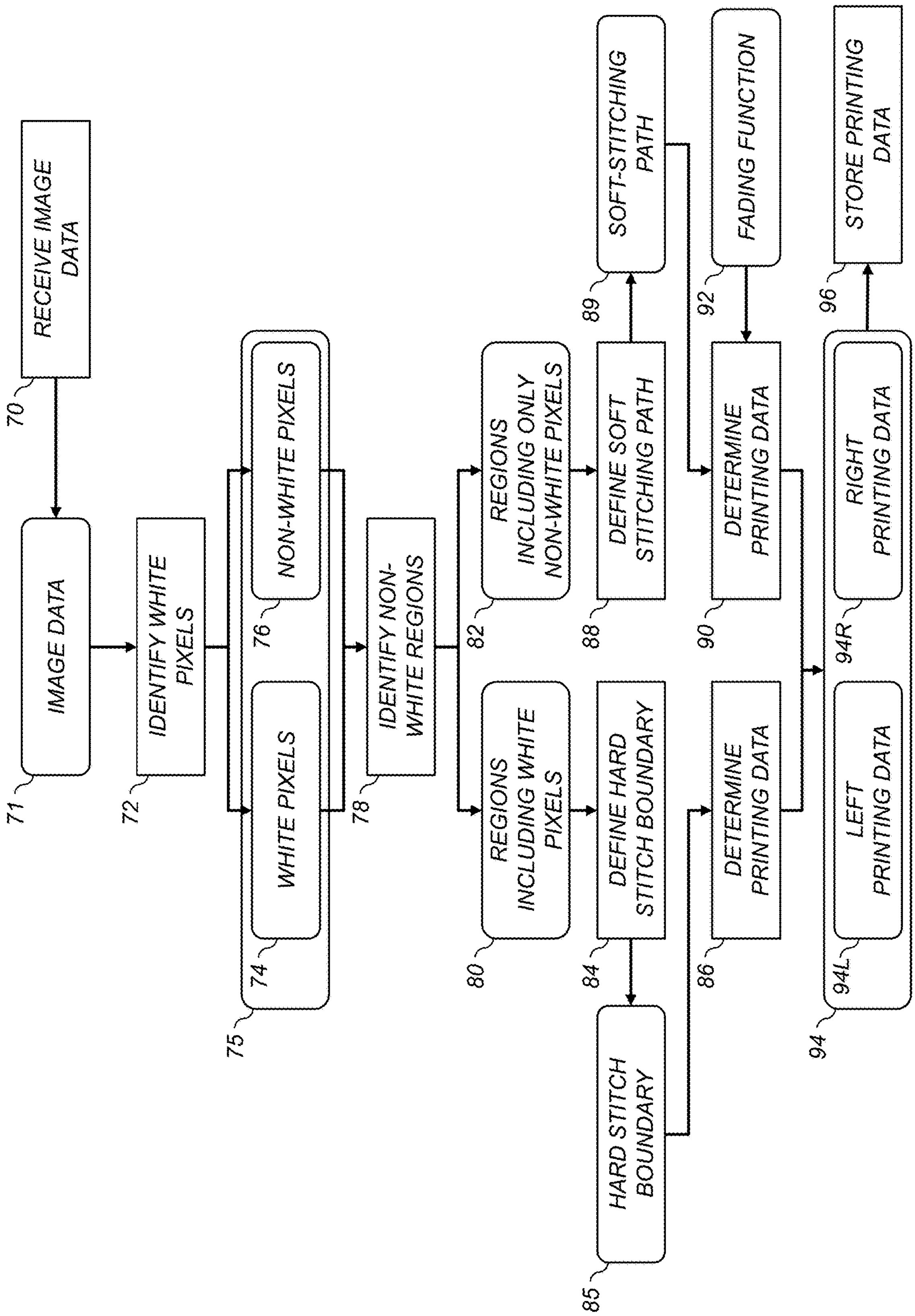
FIG. 4 shows a flowchart of a method for printing in the overlap region between two jetting modules.

FIG. 4 shows a flow chart of an image-adaptive stitching method in accordance with an exemplary embodiment. The stitching method is used for printing on an inkjet printer using a linehead with a plurality of jetting modules 30 in a staggered, partially overlapping configuration as illustrated in FIG. 2. The method is used to process image data for a single color channel of an input image which has already been color managed and separated. Since every color plane of the input image is processed separately, the method will be described with reference to a single generic color plane unless specified differently in the context. Therefore, the terms "color values" or "gray values" only refer to the tone level of the pixels in the particular plane of image data, which can correspond to any ink color. A receive image data step 70 is used to receive image data 71 including an array of image pixels for the particular color channel to be processed and printed.

Figure 5B:
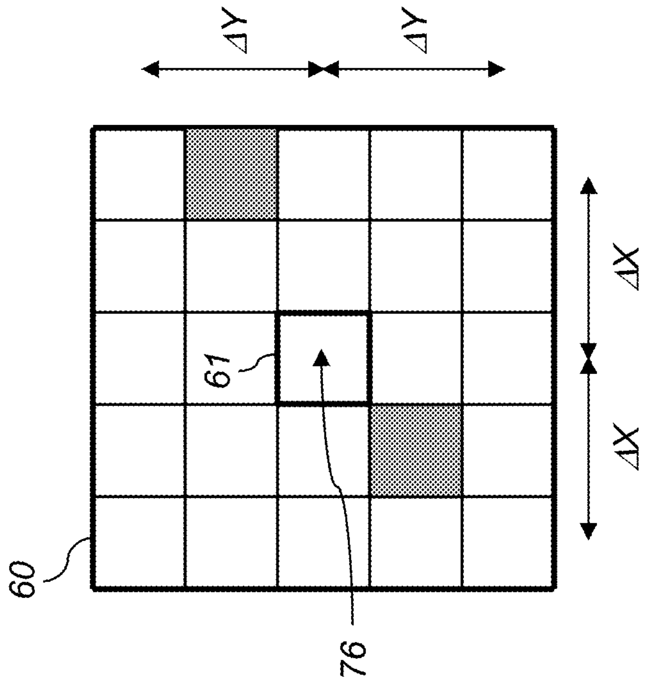
FIGS. 5A-5B illustrate a square zone useful for determining white pixels in an exemplary configuration.
Figure 5A:
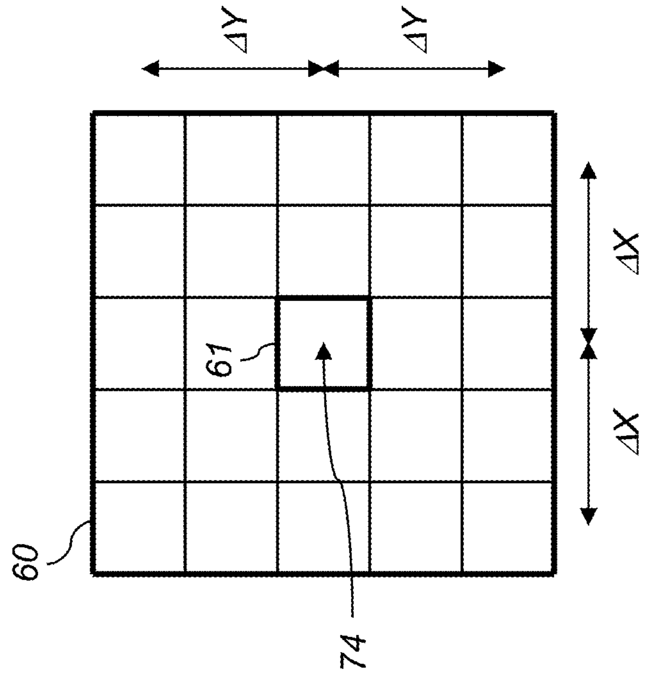

The stitching algorithm is split into two parts. A hard-stitching process is applied to portions of the overlap region that contain white pixels, and a soft-stitching process is applied to portions of the overlap region that contain only non-white pixels. The soft-stitching process can also be referred to as a "fading stitch" process. An identify white pixels step 72 is used to analyze the image pixels in the overlap region 34 (FIG. 3) to designate white pixels 74 and non-white pixels 76. In a preferred embodiment, an image pixel is considered to be a white pixel 74 if the image pixel itself is white and falls within the white stitch zone 35 (FIG. 3), and all of the image pixels in a defined zone around the image pixel are also white. This is illustrated in FIGS. 5A-5B. In this example the defined zone 60 is a rectangular region centered on a center pixel 61 including a specified number of columns ($\Delta X$) and rows ($\Delta Y$) around the center pixel 61. In this example, $\Delta X=\Delta Y=2$, such that the defined zone is a 5×5 square region. In other configurations, the defined zone 60 can have a different size or shape. For example, the zone 60 can take the form of a rectangle where $\Delta X\neq\Delta Y$, or a circular region or an elliptical region. In the example shown in FIG. 5A, all of the pixels in the defined zone 60 are white (i.e., no ink is to be printed) so that the center pixel 61 is designated to be a white pixel 74. In the example shown in FIG. 5B, the center pixel 61 is white, however, two of the image pixels in the defined zone 60 are not white (as shown by the gray shading). Therefore, the center pixel 61 in this case is designated to be a non-white pixel 76.

A white pixel map 75 is preferably formed and used to indicate which image pixels are white pixels 74 and which are non-white pixels 76. In some embodiments the white pixel map 75 stores binary values where a "0" is stored to indicate a non-white pixel 76 and a "1" is stored to indicate a white pixel 74. In a preferred embodiment, the white pixel map 75 stores an integer value for white pixels 74 where the stored value is a number representing the accumulated number of rows where white pixels can be reached in the rows below with a movement of the cross-track position by +/−one pixel. For example, storing a "5" would indicate that the current pixel is a white pixel and that it is the $5^{th}$ consecutive row where white pixels can be reached within a triangular shaped region below the current pixel. Or to phrase it recursively, there is a white pixel in the row below that can be reached going one row down and +/−1 pixel to left or right which has a value of 4. This can be represented using the following logic:

```
if(IsWhite(x,y)=FALSE)

Map(x,y)=0;

else

Map(x,y)=max[Map(x−1,y+1),Map(x,y+1),Map(x+1,
    y+1)]+1;

Map(x,y)=clip[Map(x,y),0,MaxMap];
```

where IsWhite(x,y) is a function which returns TRUE if the image pixel at a location (x,y) is white, and FALSE if the image pixel is non-white, Map(x,y) is the white pixel map, max[ ] is a function which returns the maximum of its arguments, and the clip[ ] function is used to limit the value of Map(x,y) to have a defined maximum value (e.g., MaxMap=255). The Map(x,y) values are computed starting at the bottom of the white stitch zone 35 and working up line-by-line. The bottom line is initialized with Map(x,H)=0 for non-white pixels, and Map(x,H)=MaxMap for white pixels, where H is the number of rows.

Figure 6A:
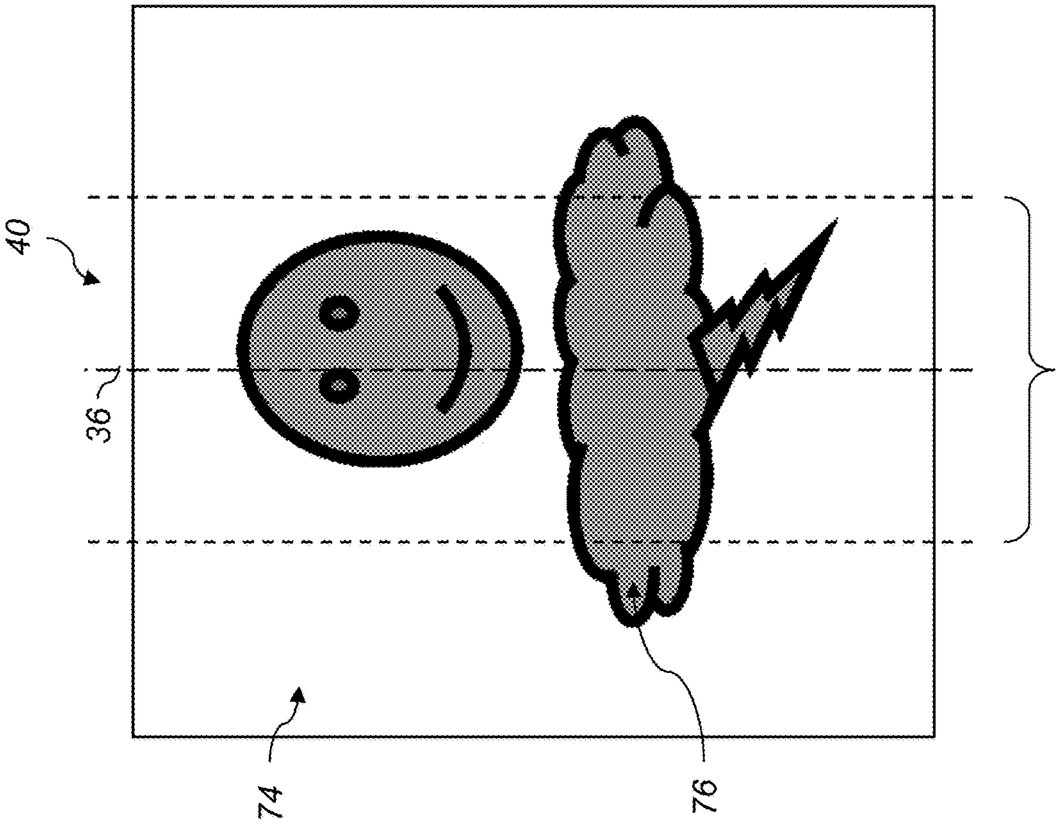
FIG. 6A shows an example of image data straddling an overlap region between two jetting modules.

FIG. 6A shows an example of an input image 40 having image content that spans the white stich zone 35 between two jetting modules 30A, 30B (FIG. 3). The input image 40 includes white pixels 74 and non-white pixels 76.

Figure 6C:
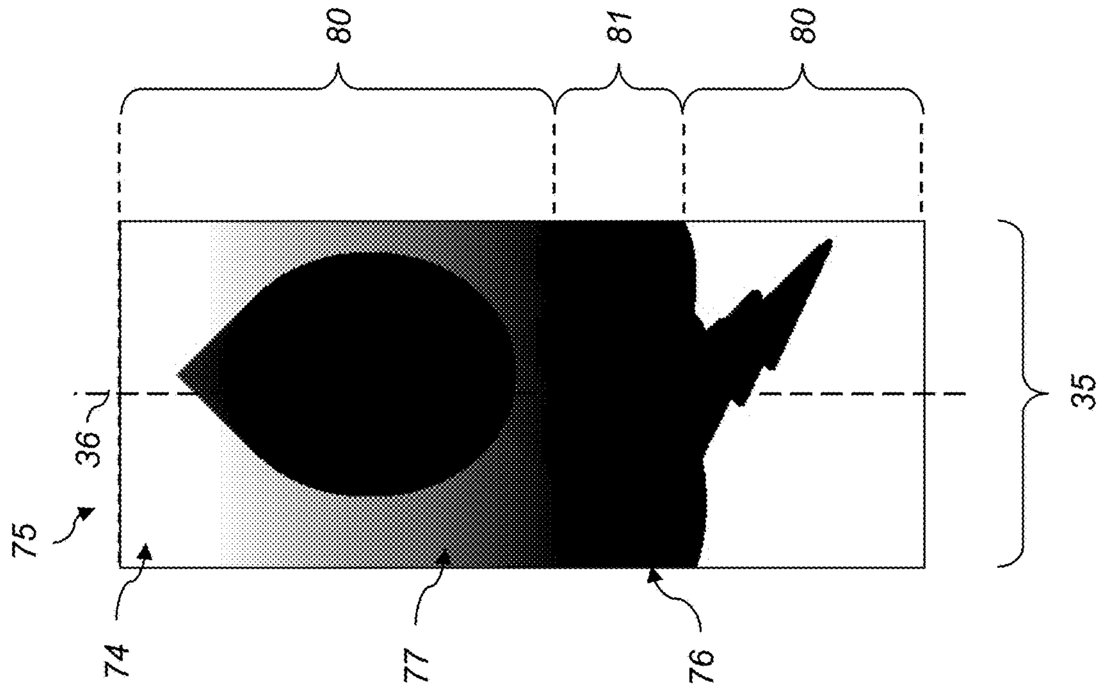
FIG. 6C illustrates a white pixel map determined for the image data of FIG. 6A.
Figure 6B:
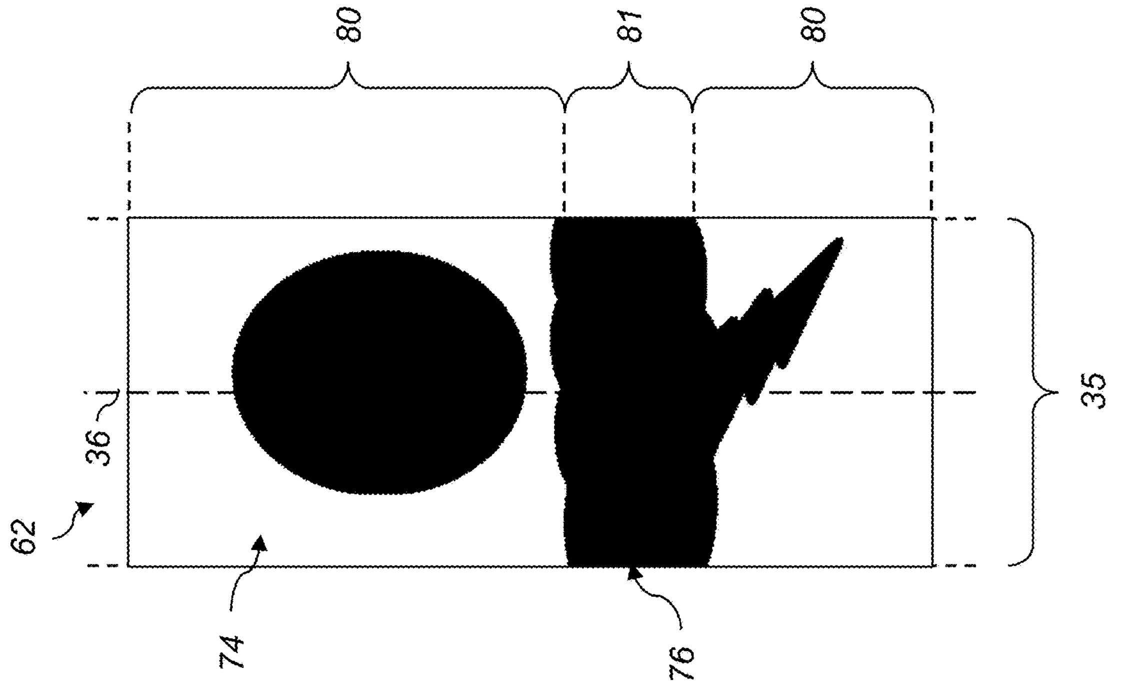
FIG. 6B illustrates the determined white pixels for the image data of FIG. 6A.

FIG. 6B shows a binary white pixel map 62 determined for the input image 40 of FIG. 6A. The non-white pixels 76 are shown as black, and the white pixels 74 are shown as white.

FIG. 6C shows a corresponding white pixel map 75 calculated using the preferred method discussed above where the values range from 0 to 255. Non-white pixels 76 will have a value of 0, and white pixels 74 will have values that range from 1-255 depending on the distance to the non-white pixels 76 below each white pixel 74. The white pixel map 75 includes a gradient region 77 where the values transition from 1 to 255 as the pixels get farther above the non-white pixels 76. (Note that "above" in this context includes pixels within a ±45° degree triangle.)

Returning to a discussion of FIG. 4, an identify non-white regions step 78 is used to divide the white stitch zone 35 into regions including white pixels 80 and regions including only non-white pixels 82. These regions represent sets of contiguous rows that either include white pixels or have only non-white pixels. One means to do this is to determine the maximum value for each row of the white pixel map 75 (FIG. 6C). If the maximum value for a particular row is 0, then that row contains only non-white pixels 76. Groups of consecutive rows that contain only non-white pixels are designated to be regions including only non-white pixels 82 as illustrated in FIGS. 6B and 6C. If the maximum value for a particular row is greater than 0, then that row contains at least one white pixel 74. Groups of consecutive rows that contain white pixels are designated to be regions including white pixels 80 as illustrated in FIGS. 6B and 6C. In accordance with the present invention, a hard-stitching process is applied to the regions including white pixels 80, and a soft-stitching process is applied to the regions including only non-white pixels 82.

The process of defining the stitching path used in the stitching processes works from top to bottom. For rows within the regions including white pixels 80, a define hard stitch boundary step 84 is used to analyze each row of image data to define a hard stitch boundary 85 within the white stitch zone 35. A determine printing data step 86 is then used to determine the printing data 94 for the jetting modules 30A, 30B. Image pixels to the left of the hard stitch boundary 85 are designated to be printed with the left jetting module 30A, and image pixels to the right of the hard stitch boundary 85 are designated to be printed with the right jetting module 30B. In a preferred embodiment, the define hard stitch boundary step 84 attempts to find an area of white pixels large enough to do a stitch. The area is selected such that the hard stitch boundary 85 is as long (vertically) as possible, and stays as close to the center of the white stitch zone 35 as possible from one row to the next.

Figure 6D:
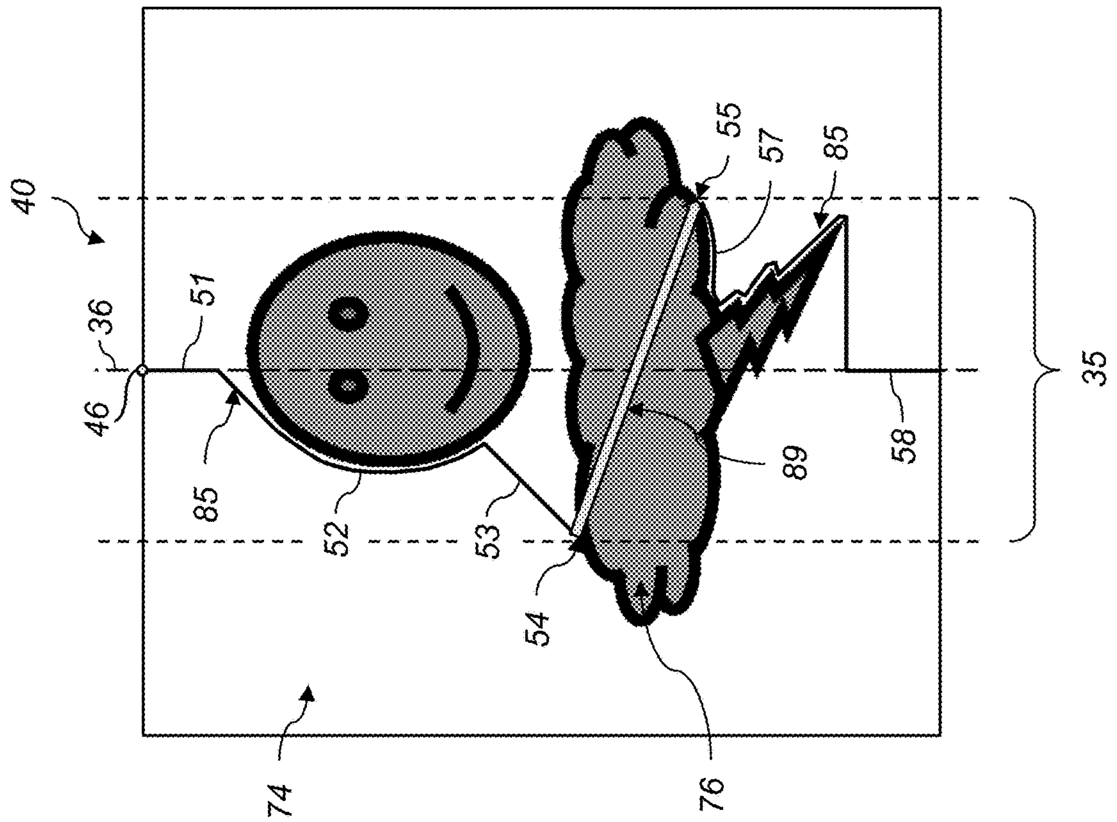
FIG. 6D illustrates a hard stitch path determined for rows including white pixels and a soft stitching path determined for rows include only non-white pixels.

When the top-most region in the white stitch zone is a region including white pixels 80, a starting point 46 is selected that corresponds to the pixel that produces the longest continuous area of white in the rows below (i.e., the white pixel map 75 (FIG. 6C) has the largest value) which is closest to the centerline 36 as illustrated in FIG. 6D. In an exemplary embodiment, this point is found by starting from the center of the first row of the white pixel map 75 (FIG. 6C) and searching left and right in an alternating pattern until the value of the pixel white pixel map 75 equals the maximum value in that row. The resulting pixel is used as the starting point 46 for the hard stitch boundary 85. For each subsequent row in the region including white pixels 80, the location of the hard stitch boundary in the previous row is used as an initial point, and then the pixels to the right and left are searched to find the pixel where the white pixel map 75 is largest. The search direction is always toward the centerline 36 first to avoid staying at the edge of the white stitch zone 35. In some embodiments, if there are pixels closer to the centerline where the white pixel map 75 has the same or greater value, the hard stitch boundary 85 will jump to the contiguous point closest to the centerline 36 having the same or greater value. For example, in FIG. 6D, the hard stitch boundary 85 jumps from the boundary path portion 57 that is following along the edge of the lightning bolt to the boundary path portion 58 on the centerline 36 at the bottom of the lightning bolt. If there are multiple areas of white pixels that are separated by non-white pixels, the search is limited to the same white area (i.e., the search will terminate on each side of it hits a non-white pixel). If there are no white pixels that are in the same white area, the algorithm can jump to a different white area. In some embodiments, a soft-stitching process is used to transition to the other white area. In the example shown in FIG. 6D, using this process determines a hard stitch boundary 85 that includes a boundary path portion 51 that follows the centerline 36, a contour-following boundary path portion 52 which tracks along the edge of the non-white pixel area, and a transition boundary path portion 53 which ends at a lowest white point 54 in the region including white pixels 80.

In some embodiments, if the maximum value of the white pixel map 75 in a particular row is in a different white pixel area, the hard stitch boundary can jump to the other white pixel area. In some configurations, the jump to the other white pixel area is constrained such that there is a maximum number of columns that can be moved for each row such that it may take a number of rows to complete the transition to the other white pixel area. A soft stitching process is preferably used across the transition.

In some embodiments, if a point on the determined hard stitch boundary 85 is in the inner area 39 (FIG. 3), it is used directly for the hard stitching process. However, if it is in one of the outer areas 37, 38 towards the edge of the white stitch zone 35, the algorithm will transition to a soft stitching process. This serves to avoid a visible transition from the hard stitching process to the soft stitching process. Similarly, in some embodiments, if the value of the white pixel map 75 is less than a predefined threshold at the hard stitch boundary 85 (i.e., if the hard stitch boundary 85 is getting close to a region of nonwhite pixels 76), the algorithm will transition to a soft stitching process.

For regions including only non-white pixels 82, a define soft-stitching path step 88 (FIG. 4) is used to define a soft-stitching path 89 (FIG. 6D) through the region. The soft-stitching path 89 connect a white pixel in the row above the region including only non-white pixels 82 (e.g., the lowest white point 54) to a white pixel in a row below the region including only non-white pixels 82 (e.g., a highest white point 55). In an exemplary embodiment, the soft-stitching path 89 is a straight line that connects the lowest white point 54 and the highest white point 55. In other embodiments, the soft-stitching path 89 can take other forms. For example, the soft-stitching path 89 can be a spline path that connects the lowest white point 54 and the highest white point 55. The spline path can be constrained to have specified characteristics. For example, the slope can be constrained at the ends of the spline path so that there is a smooth transition between the path of the hard-stitching boundary 85 and the soft-stitching path 89.

When the region including only non-white pixels 82 is at the top of the image, a starting point for the soft-stitching path 89 can be specified in the topmost row of the white stitch zone 35. In an exemplary embodiment, a different starting point is specified for each color channel of the input image in order to reduce the stitch visibility. The starting point can be randomly selected or can be predefined according to a specified criterion. Similarly, when the region including only non-white pixels 82 is at the bottom of the image, an ending point for the soft-stitching path 89 can be specified in the bottommost row of the white stitch zone 35.

When a region including white pixels 80 falls below a region including only non-white pixels 82, the ending point for the soft-stitching path 89 can be used as the starting point 46 for determining the hard stitch boundary 85 in the region including white pixels 80. The process described above is then used to determine the hard stitch boundary 85 for the remaining rows. In the example of FIG. 6D, the hard stitch boundary 85 includes a contour-following boundary path portion 57 which tracks around the edge of the non-white pixel region. The hard stitch boundary 85 then jumps over to a centerline-following boundary path portion 58.

Figure 6F:
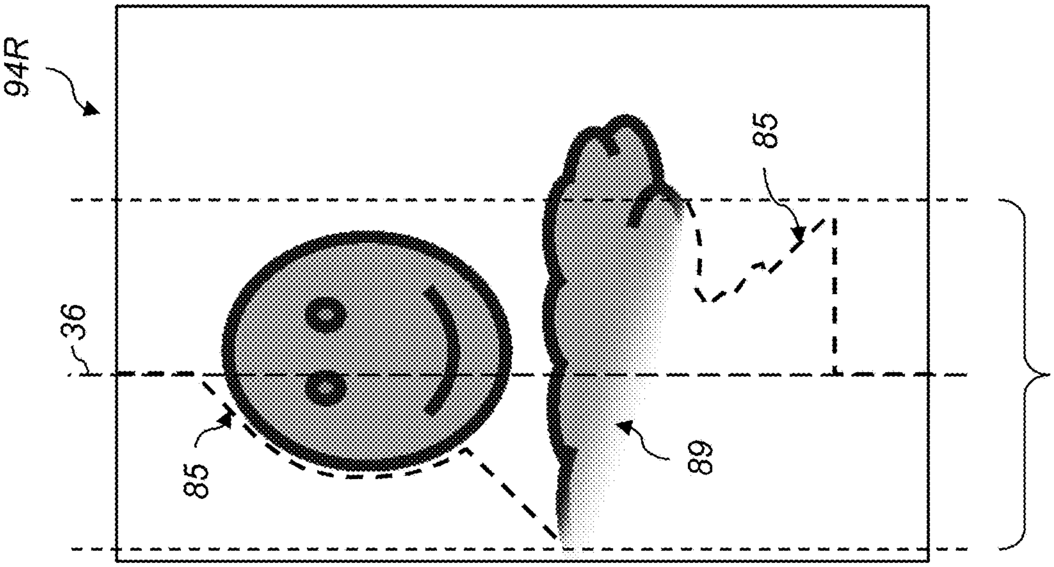
FIGS. 6E-6F shows image data determined for the left and right jetting modules, respectively, using the stitching paths of FIG. 6D.
Figure 6E:
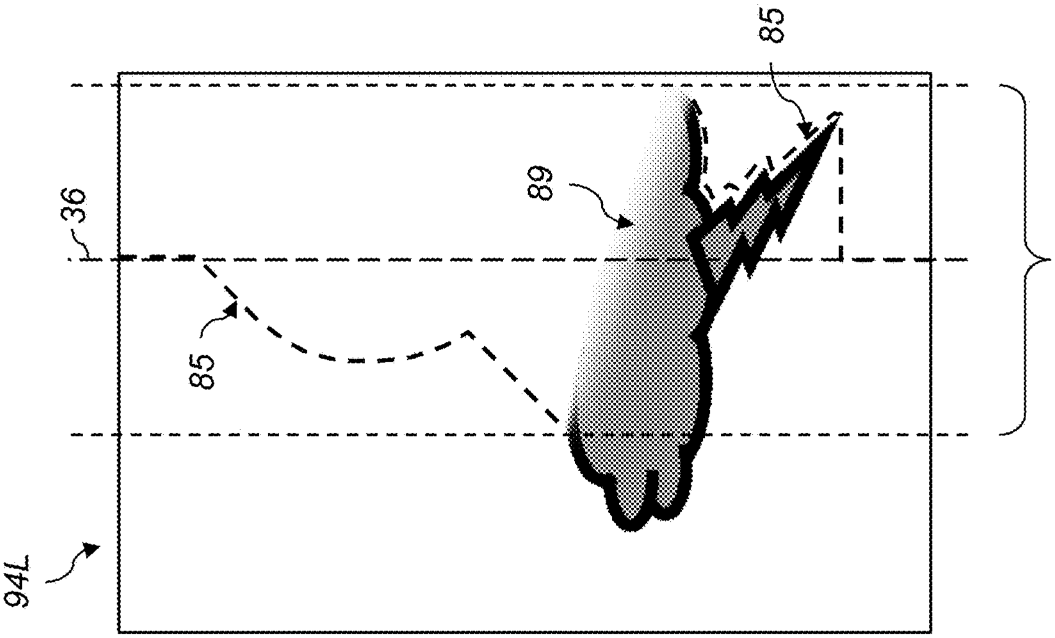

Returning to a discussion of FIG. 4, once the soft stitching path 89 is defined (FIG. 6D), a determine printing data step 90 is used to determine the printing data 94 for the regions including only non-white pixels 82 using a "soft stitching" process. The soft stitching process overlaps the image data printed by the left and right jetting modules 30A, 30B, basically fading out the left jetting modules 30A and fading in the right jetting module 30B. The determined printing data 94 includes left printing data 94L (see FIG. 6E) for the left jetting module 30A, and right printing data 94R (see FIG. 6F) for the right jetting module 30B. The form of the fading algorithm used by the soft stitching process will significantly influence the visibility of the stitching boundary. As will be discussed later, the fading algorithm typically uses a fading function 92, as well as a number of parameters, to control the stitching process. The parameters can be determined empirically, and may be dependent on the substrate and ink conditions.

A store printing data step 96 is used to store the determined printing data 94 for use in printing the image data 71 on the inkjet printer. Typically, a binary halftoning algorithm will be applied to the stored left and right printing data 94L, 94R. The resulting binary image values are then used to determine whether a drop is printed with each nozzle of the jetting modules 30A, 30B.

To estimate the color resulting from overprinting the faded areas, the fading algorithm uses a statistical approach. The assumption is made that all color management has been applied to the input image to form color separations (i.e., color channels) where the probability p that a drop is generated at a particular point is proportional to the grayscale value of the continuous tone color separation at that point. (The value of p is a mathematical probability in the range 0 to 1.)

Figure 7B:
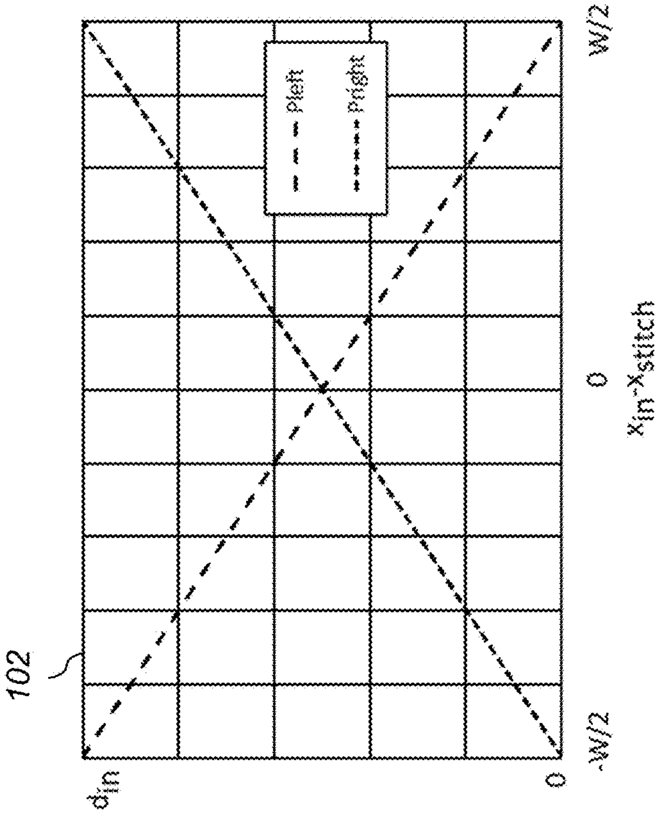
FIGS. 7A-7B illustrate exemplary fading functions.
Figure 7A:
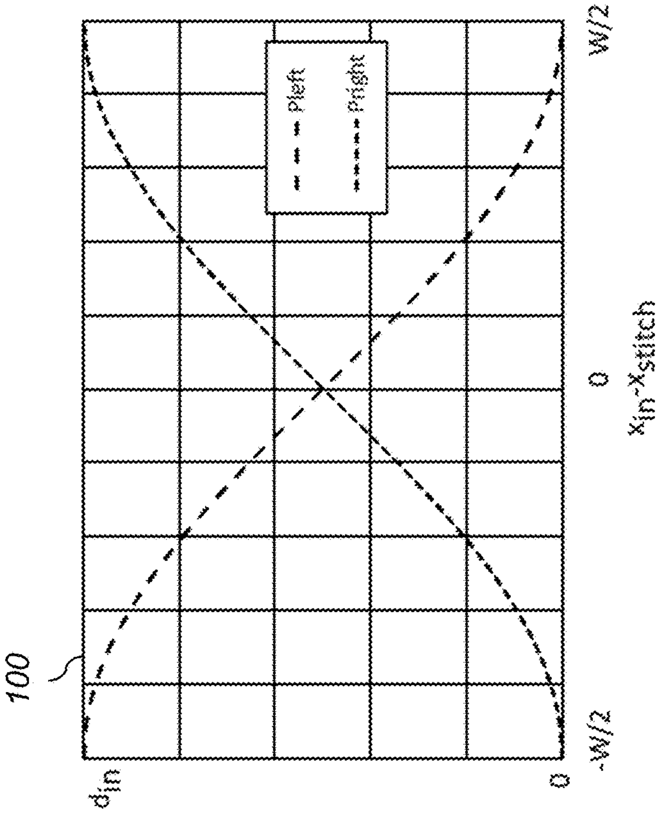

In the neighborhood of the soft stitch point, the input pixel value ($d_{in}$) will be divided into two parts, one part to be printed by the left jetting module 30A and one part to be printed by the right jetting module 30B. In an exemplary embodiment, a raised cosine is used for the fading function 92:

$$f_{fade}(x_{in})=0.5+0.5\cos(\pi(x_{in}-x_{stitch}+W/2)/W) \quad (1)$$

where $f_{fade}(x_{in})$ is the fading function 92, W is the width of the fading function, $x_{stitch}$ is the stitch point, and $x_{in}$ is the current point (within the range of $x_{stitch}\pm W/2$). The region where the fading function transitions from 1 to 0 is sometimes referred to as a transition zone. In an exemplary embodiment, W is set to be half the width of the overlap region 34 (FIG. 3). Note that when $x_{in}$ approaches the edge of the white stitch zone 35, the width of the fading function W is reduced so that the edge of the fading function is aligned with the edge of the white stitch zone 35. In the limit, for pixels at the edge of the white stitch zone 35 (FIG. 3), the width of the fading function W will be equal to the width of the outer areas 37, 38 (FIG. 3). Grayscale values for the left and right jetting modules 30A, 30B can be determined using the equations to divide the input pixel value $d_{in}$:

$$p_{left}(d_{in},x_{in})=d_{in}\times f_{fade}(x_{in}) \quad (2)$$

$$p_{right}(d_{in},x_{in})=d_{in}-p_{left}(d_{in},x_{in}) \quad (3)$$

where $p_{left}$ is a grayscale value for the left jetting module 30A, and $p_{right}$ is a grayscale value for the right jetting module 30B. FIG. 7A shows a graph 100 of $p_{left}$ and $p_{right}$ as a function of position corresponding to the cosine fading function of Eq. (1). In other configurations the fading function can take other forms. For example, FIG. 7B illustrates a similar graph 102 for a linear fading function.

The grayscale values can be viewed as probabilities of printing a dot at a certain location for both heads (typically scaled by a maximum grayscale value of 255). For overprinting two grayscale values (i.e., in the fading area), there will be a probability that a drop will be generated by both jetting modules: $p_{both}=p_{left}\times p_{right}$. Typically, the overprinted dot will provide less than double the density of a single dot, but more than the density of a single dot. As a result, the pattern created by overprinting the faded patterns from the left and right jetting modules 30A, 30B will generally have a lower density than the sum of the densities of the left and right patterns. Therefore, a correction function $f_c(p_{right},p_{left})$ can be determined to represent the loss in density:

$$d_{out}=p_{left}+p_{right}-f_c(p_{left},p_{right})\times p_{right}\times p_{left}=d_{in}-f_c(p_{left},p_{right})\times p_{right}\times p_{left} \quad (4)$$

The value of the correction function will typically be dependent on the ink and substrate and the printing conditions. A value of $f_c=0$ would correspond to the case where the overprinted dot is equivalent to two dots printed side by side, and a value of $f_c=1$ would correspond to the case where the overprinted dot is equivalent to a single dot. Empirical evaluation of typical substrates shows that values in the range of 0.7 to 0.9 yield reasonable results in many cases. In an exemplary configuration, a correction function with a constant with a value of $f_c(p_{left},p_{right})=0.9$ will be used. However, in general the correction function can be a two-dimensional function which varies as a function of $p_{left}$ and $p_{right}$, where the values of this function can be determined experimentally. Such a two-dimensional function can be represented as a 2-D LUT where the rows and columns are indexed the values of $p_{left}$ and $p_{right}$.

There are a number of different ways to correct the left and right pixels in order to compensate for the density loss. For example, the values of $p_{left}$ and $p_{right}$ can be increased until $d_{out}=d_{in}$, for example by adding a portion of $f_c$ to the values of $p_{left}$ and $p_{right}$:

$$p'_{left}(d_{in},x_{in})=p_{left}(d_{in},x_{in})+f_{fade}(x_{in})\times f_c(p_{left},p_{right}) \quad (5)$$

$$p'_{right}(d_{in},x_{in})=p_{right}(d_{in},x_{in})+[1-f_{fade}(x_{in})]\times f_c(p_{left},p_{right}) \quad (6)$$

In a preferred embodiment, an analog error diffusion process is used to distribute the error to surrounding pixels that have not been processed. From Eq. (4), the error will be given by:

$$\text{error}=d_{out}-d_{in}=-f_c(p_{left},p_{right})\times p_{right}\times p_{left} \quad (7)$$

The analog error diffusion process is similar to the well-known binary error diffusion halftoning process except that no quantization process is used to binarize the output. In this case, a fraction of the error is distributed to the grayscale values of nearby pixels that have yet to be processed.

Figure 8B:
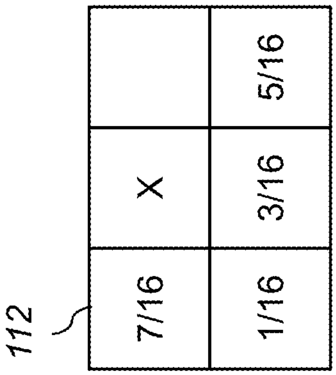
FIGS. 8A-8B illustrate exemplary error diffusion coefficients.
Figure 8A:
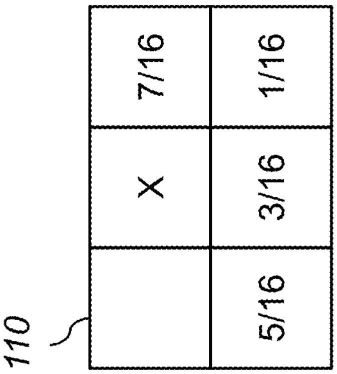

In an exemplary embodiment, the error diffusion process is performed in alternating left and right directions to avoid "one-sided" accumulation of error compensation in the relatively narrow stitch area. FIG. 8A shows an example set of error diffusion coefficients 110 for use when processing from left to right, and FIG. 8B shows an example set of error diffusion coefficients 112 for use when processing from right to left. The cell with an "x" is the pixel being processed, and the numbers in the nearby cells show the coefficients used to scale the error values. The scaled error values are then added to the input pixel values of the nearby pixels having corresponding positions.

In an exemplary embodiment, the method of the present invention is applied independently to the image data 71 (FIG. 4) for each color channel of an input image. For example, if the image is a CMYK image, the algorithm would be applied independently to the cyan, magenta, yellow and black color channels. Likewise, if the input image includes color channels for specialty inks (e.g., spot color inks), then the algorithm would be applied to those color channels as well.

In a preferred embodiment, the printing system 10 (FIG. 1) includes a data processing system that is used to perform the method of the present invention. The method can be performed using a computer program product stored on a memory system. The memory system can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more data processing systems to practice the method according to the present invention.

The invention has been described in detail with particular reference to certain preferred embodiments thereof, but it will be understood that variations and modifications can be effected within the spirit and scope of the invention.

PARTS LIST

10 printing system
12 printing module
14 receiver medium
16 receiver motion direction
18 dryer
20 imaging system
22 imaging device
30 jetting module
30A jetting module
30B jetting module
31 nozzle array
32 printing region
34 overlap region
35 white stitch zone
36 centerline
37 outer area
38 outer area
39 inner area
40 input image
46 starting point
51 boundary path portion
52 boundary path portion
53 boundary path portion
54 lowest white point
55 highest white point
57 boundary path portion
58 boundary path portion
60 zone
61 center pixel
62 binary white pixel map
70 receive image data step
71 image data
72 identify white pixels step
74 white pixel
75 white pixel map
76 non-white pixel
77 gradient region
78 identify non-white regions step
80 region including white pixels
82 region including only non-white pixels
84 define hard stitch boundary step
85 hard stitch boundary
86 determine printing data step
88 define soft-stitching path step
89 soft-stitching path
90 determine printing data step
92 fading function
94 printing data
94L left printing data
94R right printing data
96 store printing data step
100 graph
102 graph
110 error diffusion coefficients
112 error diffusion coefficients

The invention claimed is:

1. A method of printing on an inkjet printer including a linehead with a plurality of jetting modules in a staggered, partially overlapping configuration, each of the plurality of jetting modules including a plurality of nozzles, wherein some of the nozzles of adjacent jetting modules overlap each other in a stitch area, the method comprising:

receiving image data including an array of image pixels to be printed using the inkjet printer;

for image pixels that fall within a particular stitch area where the nozzles of a left jetting module and a right jetting module overlap:

analyzing the image data within the particular stitch area to designate white pixels and non-white pixels;

for rows of image pixels where the particular stitch area includes white pixels:

defining a hard stitch boundary within the stitch area;

storing printing data indicating that image pixels within the particular stitch area to the left of the hard stitch boundary are to be printed using the left jetting module; and storing printing data indicating that image pixels within the particular stitch area to the right of the hard stitch boundary are to be printed using the right jetting module; and for image regions of the image data where the rows of image pixels within the stitch area include only non-white pixels:

defining a soft-stitching path through the image region; and storing printing data indicating that image pixels within the image region are to be printed using a fading function that gradually transitions from printing image pixels with the left jetting module to printing image pixels with the right jetting module in a transition zone around the soft-stitching path.

2. The method of claim 1, further including using the inkjet printer to print the image pixels that fall within the particular stitch area using the stored printing data.

3. The method of claim 1, wherein the image pixels having only white image content in a defined zone around the image pixels are designated to be white pixels, and all other image pixels are designated to be non-white pixels.

4. The method of claim 3, wherein the defined zone is a rectangular region including a specified number of rows and columns around the image pixel.

5. The method of claim 3, wherein the defined zone is a circular or elliptical region of a specified size around the image pixel.

6. The method of claim 1, wherein the soft-stitching path connects a white pixel in a row above the image region to a white pixel in a row below the image region.

7. The method of claim 6, wherein the soft-stitching path is defined to be a straight line between the white pixel in the row above the image region and the white pixel in the row below the image region.

8. The method of claim 6, wherein the soft-stitching path is a spline path defined between the white pixel in the row above the image region and the white pixel in the row below the image region.

9. The method of claim 1, wherein the fading function provides scale values that are applied to the image pixels in the transition zone to determine pixel values for the left and right jetting modules.

10. The method of claim 9, wherein the scale values applied to pixels to be printed with the left jetting module transition from a value of 1.0 at a left side of the transition zone to a value of 0.0 at a right edge of the transition zone, and the scale values applied to pixels to be printed with the right jetting module transition from a value of 0.0 at a left side of the transition zone to a value of 1.0 at a right edge of the transition zone.

11. The method of claim 9, wherein the scale values of the fading function are selected so that an output density value in the transition zone is equal to an input density level.

12. The method of claim 1, wherein error values are determined between an input density level and an output density level for pixels in the transition zone, and an error diffusion process is used to distribute the determined error value is distributed to the image pixels that have not been processed.

* * * * *